(12) United States Patent
Vogel

(10) Patent No.: US 9,950,384 B2
(45) Date of Patent: Apr. 24, 2018

(54) WELDING POWER SUPPLY WITH REGULATED BACKGROUND POWER SUPPLY

(75) Inventor: Bernard J. Vogel, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 2014 days.

(21) Appl. No.: 12/946,748

(22) Filed: Nov. 15, 2010

(65) Prior Publication Data

US 2011/0220620 A1    Sep. 15, 2011

Related U.S. Application Data

(60) Provisional application No. 61/312,756, filed on Mar. 11, 2010.

(51) Int. Cl.
*B23K 11/04* (2006.01)
*B23K 9/10* (2006.01)

(52) U.S. Cl.
CPC ............ *B23K 9/1006* (2013.01); *B23K 9/105* (2013.01); *B23K 9/1043* (2013.01)

(58) Field of Classification Search
USPC ........... 219/108–110, 130.01, 130.1, 130.21, 219/137 PS, 130.4, 130.5, 130.51, 133, 219/134; 363/65; 307/44, 45, 58, 80, 82, 307/86
See application file for complete search history.

(56) References Cited

U.S. PATENT DOCUMENTS

| | | | |
|---|---|---|---|
| 5,218,182 A | 6/1993 | Vogel et al. | |
| 5,645,741 A * | 7/1997 | Terayama et al. | ......... 219/130.4 |
| 5,991,180 A | 11/1999 | Vogel et al. | |
| 6,034,350 A | 3/2000 | Heraly et al. | |
| 6,384,373 B1 | 5/2002 | Schwartz et al. | |
| 6,388,232 B1 | 5/2002 | Samodell et al. | |
| 7,109,437 B2 | 9/2006 | Samodell | |
| 7,385,159 B2 | 6/2008 | Stava | |
| 2008/0061045 A1* | 3/2008 | Eldridge | .................... 219/130.1 |
| 2011/0049115 A1* | 3/2011 | Luo | .......................... 219/130.21 |

FOREIGN PATENT DOCUMENTS

| | | |
|---|---|---|
| CN | 201143590 | 11/2008 |
| EP | 0719612 A1 | 7/1996 |

OTHER PUBLICATIONS

International Search Report & Written Opinion of PCT/US2011/027608 dated Apr. 23, 2012.

* cited by examiner

*Primary Examiner* — Dana Ross
*Assistant Examiner* — James Sims, III
(74) *Attorney, Agent, or Firm* — McAndrews, Held & Malloy, Ltd.

(57) ABSTRACT

Embodiments of a welding power supply including a main power supply and a background power supply are provided. The main power supply includes a first transformer that supplies a first power output to welding electrodes for use in a welding operation. The background power supply includes a secondary transformer that charges an energy storage device to a regulated voltage level and is adapted to discharge the energy storage device by a controlled amount to supply a second regulated power output to the welding electrodes for use in the welding operation when a transient voltage event occurs.

8 Claims, 4 Drawing Sheets

WELDING POWER SUPPLY WITH REGULATED BACKGROUND POWER SUPPLY

CROSS REFERENCE TO RELATED APPLICATIONS

This application is a Non-Provisional Patent Application of U.S. Provisional Patent Application No. 61/312,756 entitled "Welding Power Supply with Improved Background Current Supply", filed Mar. 11, 2010, which is herein incorporated by reference.

BACKGROUND

The invention relates generally to welding systems, and, more particularly to welding power supplies with regulated background power supplies.

Many types of welding power supplies capable of providing a welding power output from an alternating current (AC) or a direct current (DC) source of power have been developed. Typically, such welding power supplies are configured to provide an average or rated power output for a welding process, such as a shielded metal arc welding (SMAW) operation. Unfortunately, during the welding operation, transient voltage requirements that may be equal to approximately two or three times the average or rated voltage level may be encountered. Such transient voltage requirements are typically of short duration (e.g., shorter than 1 msec) when compared to the overall welding time.

If a welding power supply is not capable of providing the transient voltage requirements in addition to the average load requirements, then an operator may observe undesirable effects, such as arc instability, arc outages, stubbing, improper welding, and so forth. Accordingly, welding power supplies capable of providing the average or rated load requirements as well as the transient high voltage requirements have been developed. For example, in some existing power supplies, the main inverter of an inverter-type power supply is designed to meet the dynamic requirements. However, such power supplies often have a higher transformer turns ratio, higher currents in the inverter switches, higher power losses, and so forth. Accordingly, there exists a need for improved power supplies capable of meeting the rated load requirements as well as the transient load requirements.

BRIEF DESCRIPTION

In an exemplary embodiment, a welding power supply includes a background circuit including a background power supply capable of outputting a first power output and an energy storage device adapted to be charged by the first power output to a programmable first voltage level capable of being regulated to one of a variety of voltage levels. The background circuit also includes a fast acting switch coupled to the energy storage device and adapted to switch, to restrict or allow voltage discharge from the energy storage device to welding electrodes. The background circuit further includes a control circuit coupled to the background power supply and the fast acting switch, adapted to selectively activate the background power supply to output the first power output when the energy storage device is not charged to the regulated first voltage level, and further adapted to actuate the fast acting switch to allow voltage discharge of the energy storage device when a transient high voltage event is detected.

In another embodiment, a welding power supply includes a main power supply adapted to supply output current to welding electrodes for use in a welding operation when the power or voltage output requirement does not exceed a predetermined threshold and to not supply output current to the welding electrodes when the power or voltage output requirement exceeds the predetermined threshold. The welding power supply also includes a background circuit adapted to supply output current to the welding electrodes for use in the welding operation when the power or voltage output requirement exceeds the predetermined threshold and to not supply output current to the welding electrodes when the power or voltage output requirement does not exceed the predetermined threshold. In some embodiments the magnitude of the output current supplied by the background circuit may be as approximately equal to the magnitude of the output current supplied by the main power supply. In other embodiments, the magnitude of the output current supplied by the background circuit may be different than the magnitude of the output current supplied by the main power supply. Still further, in some embodiments, the magnitude of the output current supplied by the background circuit may be set to a magnitude sufficient to maintain a stable welding arc during a transient high voltage event, which may be of lower magnitude than the magnitude of the output current supplied by the main power supply.

In another embodiment, a welding power supply includes a main power supply including a first transformer adapted to supply a first power output to welding electrodes for use in a welding operation. The welding power supply also includes a background circuit including a second transformer adapted to charge an energy storage device to a regulated voltage level. The background circuit is adapted to discharge the energy storage device by a controlled amount to supply a second regulated power output to the welding electrodes for use in the welding operation. The welding power supply also includes a control circuit coupled to the main power supply and the background circuit and adapted to selectively activate and deactivate the supply of the first power output and the second regulated power output to provide a desired welding power output to the welding electrodes. In other embodiments, the control circuit may selectively activate and deactivate only the supply of the second regulated power output to supplement the first power output during a transient high voltage event.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of a welding power supply include a background circuit capable of providing power for a welding load during instances in which a transient voltage requirement exceeds the average load requirement for which the welding power supply is rated. For example, the background circuit may provide power during high voltage requirements of short duration that may occur during arc initiation, when welding with certain types of welding electrodes, when welding with certain distances established between the electrode and the work piece, and so forth. Accordingly, in one embodiment, the background circuit may provide power that supplements a main power supply output, and the main power supply and the background power supply outputs may be coupled to produce the welding power output. In another embodiment, however, the background circuit may provide the entire welding power output during instances of high transient voltage requirements.

Embodiments of the disclosed welding power supplies may include circuitry configured to regulate the power provided by the background circuit to a desired voltage or current level. For example, in one embodiment, the circuitry may regulate a voltage on an energy storage device (e.g., a capacitor) to maintain a desired minimum current level at the welding power output. As such, presently disclosed embodiments may provide for partial or full discharge of the energy storage device via regulated control of the background circuit. Further, such control circuitry may also be utilized to substantially prevent the voltage on the energy storage device from being supplied to the welding power output during open circuit conditions. As used herein, an open circuit condition is a condition in which an arc is not established or has been extinguished and no current is flowing in the welding electrodes. Accordingly, presently disclosed welding power supplies include background circuitry that is regulated to provide a controlled voltage output level that may be altered as desired (e.g., based on a type of welding electrode being used in the welding operation).

Figure 1:
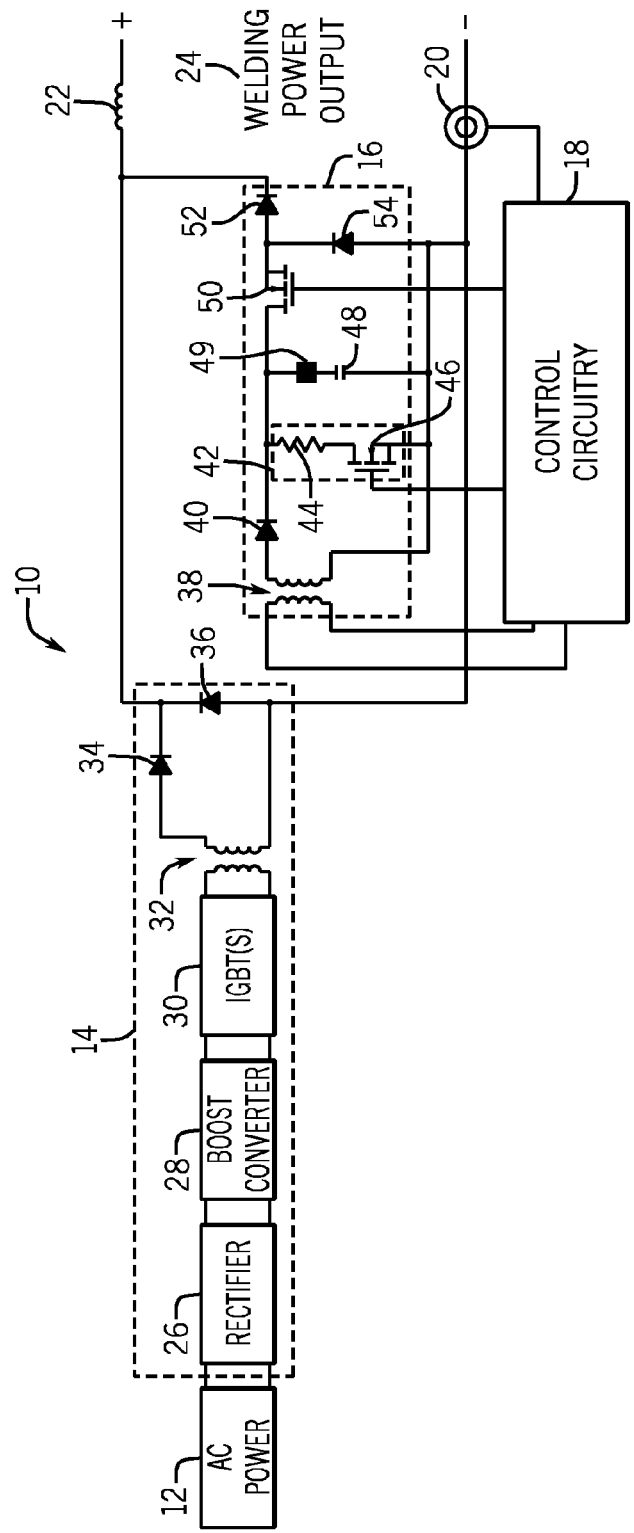
FIG. 1 is an electrical block diagram illustrating an exemplary inverter power supply including a main power supply and a background power supply in accordance with aspects of the present invention.

Turning now to the drawings, the embodiment illustrated in FIG. 1 shows an exemplary inverter welding power supply 10. However, it should be noted that embodiments of the present invention may be applied to any of a variety of suitable inverter type power supplies, such as forward circuit, full-bridge, half-bridge, flyback, and so forth. Still further, presently disclosed background circuitry and control thereof may also be applied to embodiments of chopper or secondary switcher type power supply circuits. Indeed, any of a variety of suitable types or configurations of power supply circuits may be utilized in conjunction with the background circuits and control thereof disclosed herein.

Specifically, FIG. 1 illustrates an exemplary inverter power supply 10. The illustrated inverter power supply 10 includes an alternating current (AC) power source 12, a main power supply 14, a background circuit 16, control circuitry 18, a current sensor 20, and an inductor 22 that operate collectively to provide a regulated welding power output 24. In some embodiments, the regulated welding power output may be controlled to provide an approximately constant current output suitable for shielded metal arc welding (SMAW). The welding power output may be further controlled to provide additional characteristics, such as hot start, dig, arc force, droop and so forth, which may be required or desirable to provide a welding power output suitable for SMAW. In addition, in certain embodiments, the welding power supply may utilize other signals, such as output voltage feedback, user inputs (e.g., a desired output current setting), dig setting, and so forth, to control and adjust the welding output as required to provide an output suitable for SMAW.

In the illustrated embodiment, the main welding power supply 14 also includes a rectifier 26, a boost converter 28, one or more insulated gate bipolar transistors 30, a primary transformer 32, a first diode 34, and a second diode 36. The background circuit 16 includes a secondary transformer 38, a third diode 40, a bleed off circuit 42 including a resistor 44 and a first switch 46, a capacitor 48, a voltage sensor 49, a second switch 50, a fourth diode 52, and a fifth diode 54.

During operation when normal operating conditions are present, the main power supply 14 receives AC power from the AC power source 12, which may be any source of primary power, such as a power grid or a wall outlet. The incoming AC power is rectified by the rectifier 26 to provide an incoming direct current (DC) voltage to the boost converter 28. The incoming DC voltage is boosted to a high DC voltage by the boost converter 28 before being switched by the IGBT switching circuit 30 at a desired frequency into the transformer 32. In some embodiments, the boost converter may be configured and controlled to provide power factor correction. In other embodiments, the boost converter may be omitted, and the output of the rectifier may be supplied to the IGBT switching circuit. The transformer 32 operates to step down the DC voltage to produce an output that is rectified by diodes 34 and 36. After rectification, the main power output produced by the main power supply 14 is routed through the inductor 22, which functions as an output filter choke to smooth the main power output to produce the welding power output 24. The welding power output 24 may be supplied in this way for rated load conditions (i.e., load conditions that fall within the volt-amp capability of the main power supply).

The main power supply 14 may include other circuitry not illustrated in FIG. 1, such as control power circuits configured to provide power to the various control circuitry, auxiliary power circuits (e.g., power to a duplex receptacle or wire feeder), user interface circuitry configured to allow the user to interact with the welding power supply, additional control circuits configured to provide control functions for additional welding processes and other features, and any number of other circuits as necessary to provide a complete welding power supply or welding system. In addition, such additional circuitry may include analog circuitry, digital circuitry, programmable devices, such as microprocessors or other devices, software, and so forth.

During transient high voltage requirements (i.e., load condition is greater than the volt-amp load line capability of the main power supply), the background circuit 16 may provide a power output to the inductor 22 to provide the welding power output 24. For example, the control circuitry 18 may identify the presence of the high voltage requirement and trigger the flow of power from the background circuitry 16 to the inductor 22 during such instances, as described in more detail below. Also, the control circuitry 18 may be additionally coupled to components of the main power supply 14 and may be configured to control the operation of the main power supply 14 as well as the background circuit 16. Still further, in other embodiments, additional control circuitry separate from control circuitry 18 may be provided to control the main power supply 14.

In one embodiment, the presence of the high voltage requirement may be identified by the control circuitry 18 by monitoring the current level present at the current sensor 20. For instance, if the necessary voltage exceeds the volt-amp load line capability of the main welding power supply, the current level detected at sensor 20 will begin to decay. Once such a current decay leads to a detected current level that falls below a predetermined threshold, the control circuitry 18 may control the background circuitry 16 to supply voltage to the inductor 22 to meet the detected transient high voltage requirement. In the illustrated embodiment, during such instances, the background circuitry 16 may be regulated to provide the entire welding power output 24 without any coupling with an output from the main power circuitry 14. In some embodiments, the current supplied by the background circuit may be at a reduced magnitude relative to the current level that is supplied by the main power supply during normal operation (i.e., when a transient high voltage requirement is not present). The magnitude of the current supplied by the background circuit may be set and controlled to a level sufficient to maintain a stable arc condition during a transient high voltage event (e.g., 30-40 amps).

The background circuit 16 may be controlled by the control circuitry 18 during a welding operation to ensure that the inverter power supply 10 is capable of meeting transient high voltage requirements that may occur during a welding operation. As such, during operation, the capacitor 48 is charged to a regulated voltage level greater than the highest anticipated transient voltage spike that may be encountered during welding. For example, the transformer 38, which may function as a flyback power supply in one embodiment, may be utilized to build up a sufficient charge on the capacitor 48. In other embodiments, transformer 38 may function as a forward converter, full-bridge, half-bridge or any number of other suitable switching power supplies or linear regulated power supplies suitable to build up a charge on capacitor 48. That is, the transformer 38 and the diode 40 may function to regulate the voltage on the capacitor 48 such that the capacitor 48 stores a particular amount of energy, as desired for the given application.

It should be noted that although not illustrated, control circuitry 18 may include components necessary to drive transformer 38, such as switching transistors, PWM control circuitry, voltage and/or current sensors, and any other desired components. Further, it should be noted that transformer 38 and its associated circuitry may derive power from a control power supply, such as the control power supply that provides power to the control circuitry 18, from an auxiliary power supply, from the output of the main power supply 14, or from any other suitable source of power.

As such, a controlled level of DC voltage is created and maintained on the capacitor 48. At any point during the welding operation, the charge on the capacitor 48 may then be selectively utilized to provide voltage during transient events in which the main power supply is unable to meet the load demand, as described in more detail below. Accordingly, embodiments of the present invention provide for charging of the capacitor 48 to a predetermined level in a regulated manner. In some embodiments, the charging of capacitor 48 may be disabled when the background circuit is not required, such as when a welding operation has been completed, when a welding process other than SMAW has been selected, when a particular electrode has been selected that does not require operation of the background circuit, and so forth.

During transient high voltage instances, the measurements obtained via the current sensor 20 will reflect a decay in the output current level. Once the feedback level from the current sensor 20 reaches a predetermined threshold level (e.g., 30 amps), the fast acting switch 50 of the background circuitry 16 is turned ON by the control circuitry 18, and the voltage stored on the capacitor 48 is applied to the output filter choke 22 in parallel with the main welding power supply. During operation, diode 52 functions as a blocking diode to substantially prevent current from the main power supply output from flowing into the background circuit. Diode 54 provides a current path for the current to flow when fast acting switch 50 turns OFF. In some embodiments, diodes 52 and/or 54 may be eliminated. In response to the supplied voltage, the output current sensed by the sensor 20 begins to increase. When the control circuitry detects that the sensed current has reached a second higher threshold (e.g., 40 amps), the control circuitry 18 turns OFF the fast acting switch 50. This cycle may be repeated multiple times as long as the transient voltage spike is detected (e.g., via sensing of a decayed current), and the main power supply 14 is not capable of meeting the output voltage requirement. When the transient voltage spike is no longer present, the main welding power supply 14 will again supply the welding power output.

Still further, in some embodiments, it may be desirable to either partially or fully discharge the capacitor 48. For example, when a welding operation has been completed and, accordingly, there is no longer a need for background circuit power, the bleed off circuit 42 may be utilized by the control circuitry 18 to quickly discharge the capacitor 48 to a lower level. For further example, when a non-SMAW welding process has been selected, the control circuitry 18 may turn ON the switch 46 to discharge the capacitor 48 to the desired level, as detected via voltage sensor 49.

During use, as the desired charge level of the capacitor 48 changes (e.g., based on factors such as the chosen welding process, the electrode type, etc.), the actual charge level of the capacitor 48 may be regulated to the new desired value. Indeed, the charge level of the capacitor 48 may be regulated by the control circuitry 18 to any desirable voltage level at any point during the welding process. For example, the voltage on the capacitor 48 may be regulated to a value greater than the highest allowed open circuit voltage (OCV) of the given welding power supply. For further example, some welding power supplies have an upper limit on OCV of less than approximately 113 volts. By limiting operation of the background power supply 16 to non-OCV conditions, the capacitor 48 can be charged to a voltage greater than the OCV limit for the given power supply.

For example, to achieve such a condition, the fast acting switch 50 may be selectively enabled when the output current sensed by the sensor 20 is greater than a predetermined threshold (e.g., 10 amps). This may allow the capacitor 48 to be charged to a voltage level sufficient to support transient voltage spikes for the entirety of their duration. For example, in one embodiment, the capacitor 48 may be a 1000 µf capacitor charged to between approximately 120 volts and approximately 180 volts to allow for sufficient amounts of stored energy to meet voltage spikes of a variety of durations. For further example, the 1000 µf capacitor charged to 120 volts would allow the background circuit 16 to supply a peak power of approximately 2800 watts for approximately 1.7 msec during an approximately 80 Volt transient spike while the same capacitor charged to approximately 180 volts would enable the background circuitry 16 to supply a peak power of approximately 2800 watts for approximately 5 msec. As such, the capacitor 48 may be charged to a voltage greater than a predetermined OCV limit, thus enabling the background cicuitry 16 to handle expected voltage spikes of a variety of durations that may occur while welding.

Figure 2A:
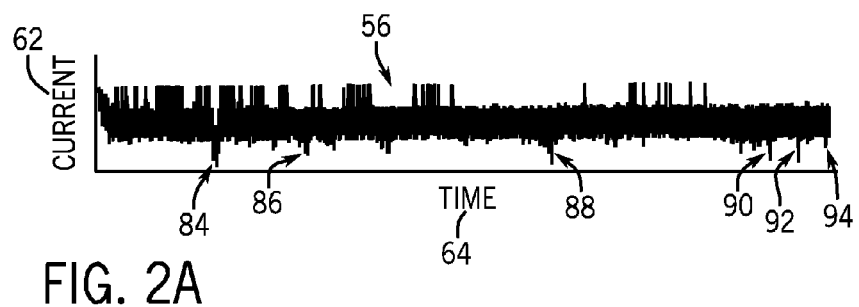
FIG. 2A illustrates an exemplary current versus time plot that may be generated during an exemplary welding operation.
Figure 2B:
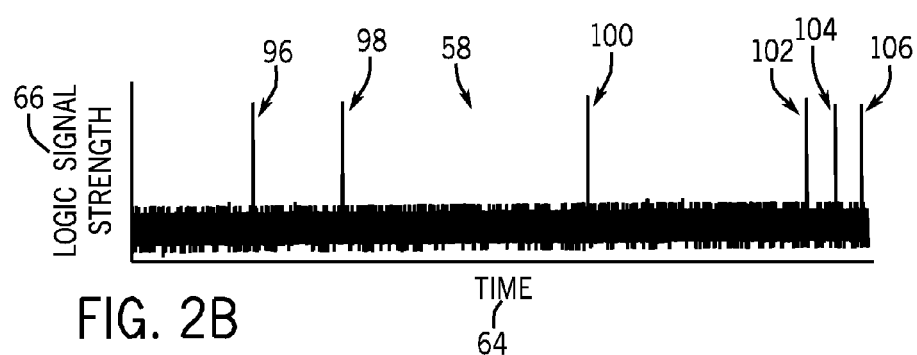
FIG. 2B illustrates an exemplary logic signal strength versus time plot that may be generated during an exemplary welding operation.
Figure 2C:
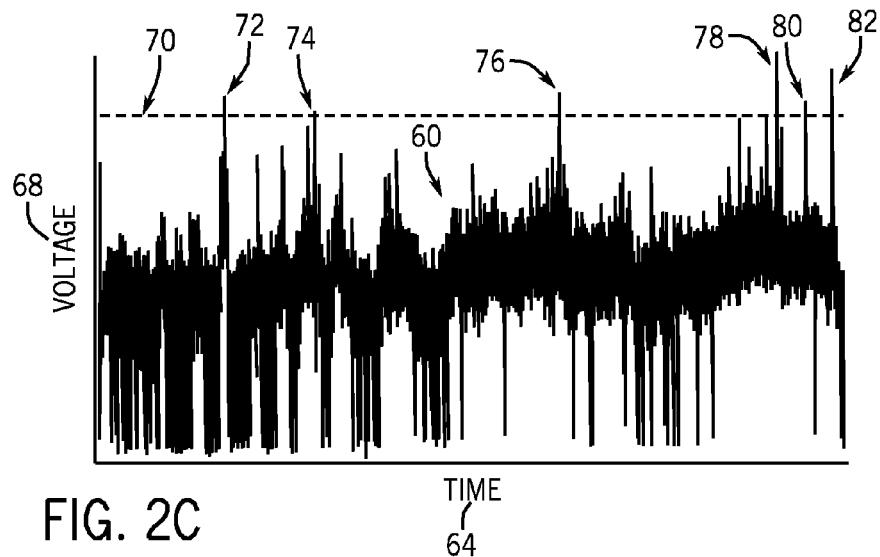
FIG. 2C illustrates an exemplary voltage versus time plot that may be generated during an exemplary welding operation.

FIG. 2A is an exemplary plot 56 of welding current versus time, FIG. 2B is an exemplary plot 58 of logic signal strength versus time, and FIG. 2C is an exemplary plot 60 of welding voltage versus time. Such plots illustrate an exemplary welding operation and method of control that may be employed during the welding operation by the control circuitry 18 of FIG. 1 to ensure that transient voltage spikes are met via activation of the background circuitry 16. In the illustrated exemplary embodiment, the current plot 56 includes a current axis 62 and a time axis 64, the logic signal plot includes a logic signal strength axis 66 and the time axis 64, and the voltage plot 60 includes a voltage axis 68 and the time axis 64. That is, each of the plots represent characteristics of a single welding operation occurring over the same time interval (e.g., 30 seconds).

As illustrated, during the majority of the welding time interval (e.g., 30 seconds), the current plot 56 shows minor fluctuations around an average steady state current value, and the voltage does not exceed a predetermined threshold value 70. Accordingly, the logic signal plot 58 illustrates that during the majority of the welding time interval, the logic signal is maintained at a substantially low level. However, in the illustrated embodiment, there are six transient voltage spikes 72, 74, 76, 78, 80, and 82 that occur in the voltage plot 60. When the voltage temporarily reaches a high value, the output current droops or decays, as indicated by the current drops 84, 86, 88, 90, 92, and 94 in the current plot 56. Such drops in current are detected by the control circuitry, for example, via measurements taken by the current sensor 20 of FIG. 1. Accordingly, the logic signal is set to high, as indicated by spikes 96, 98, 100, 102, 104, and 106 in the logic signal strength plot 58, and the background circuitry is activated (e.g., fast acting switch 50 is turned ON to discharge the capacitor 48) to meet the transient voltage requirements. After each of the transient voltage events occur, the logic signal strength returns back to a low level where it remains until another transient event is detected.

In one embodiment, the welding time interval may be 30 seconds, and during that interval, six transient voltage spikes occur, each of which are less than 1 msec in duration. Accordingly, the total cumulative time that voltage spikes occur over the 30 seconds of welding is less than approximately 6 msec, thus representing a small percentage of the total welding time. Since the background circuit 16 is only needed during a small percentage of the total welding time, the power capability of the transformer 38 utilized to charge capacitor 48 may be limited such that the average power that the background circuit is capable of providing during the entire welding operation may be maintained at a low level (e.g., less than approximately 5-10 watts). Such a feature may enable simplicity of the background circuitry, thereby endowing the inverter power supply 10 with the ability to maintain the arc during transient voltage spikes without adding significant monetary cost or complexity to the existing design.

Additionally, by limiting the power capability of the transformer 38, the possibility of the background circuit experiencing excessive thermal stress due to an abnormal condition (e.g. the background circuitry is enabled for an excessive period of time) may be substantially reduced. For example, during an instance in which the charge built up on the capacitor 48 becomes depleted, the background circuitry 16 will no longer be able to provide power beyond the level of power directed to the capacitor 48 from the transformer 38. In such a way, the background circuitry 16 may be configured as a self limiting power supply capable of providing high instantaneous peak power while being limited with regard to providing average output power.

Figure 3:
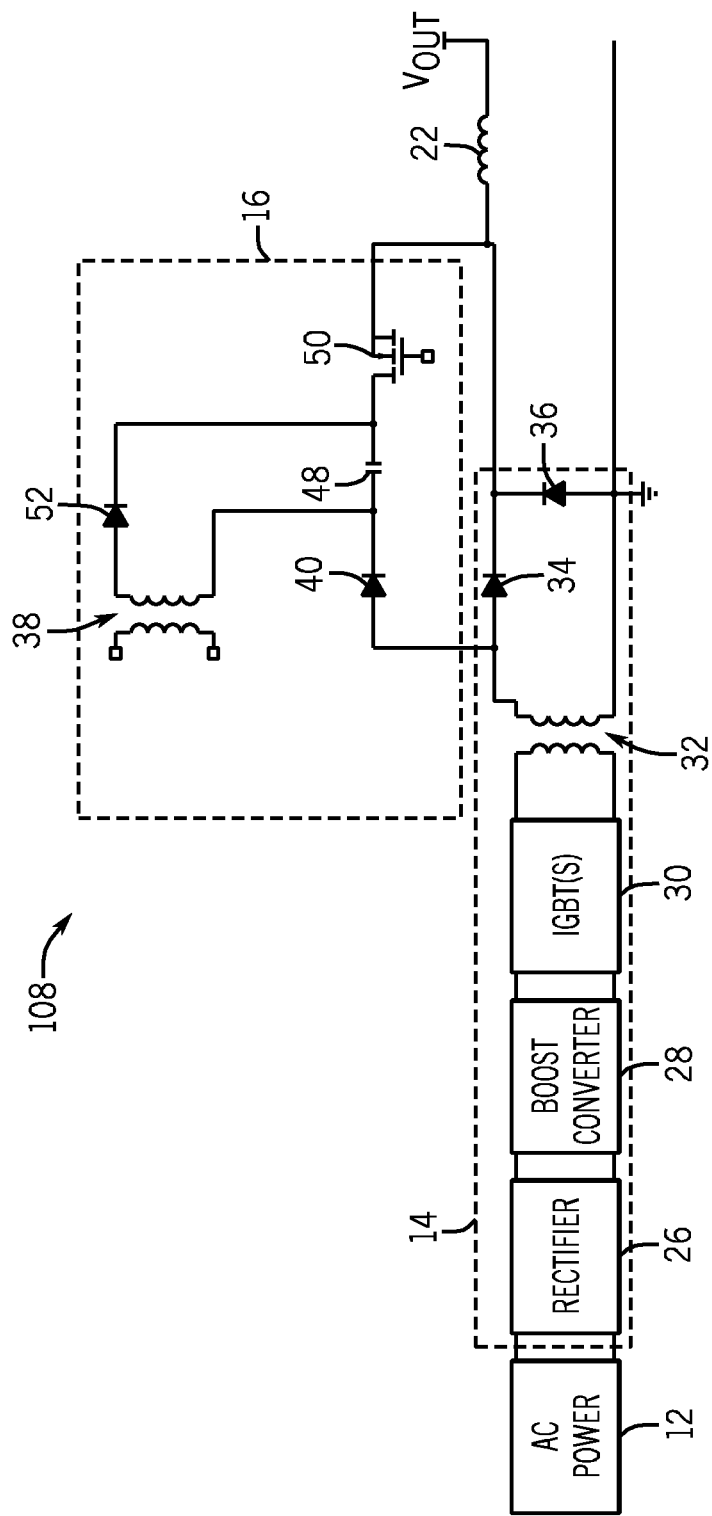
FIG. 3 is an electrical block diagram illustrating an alternate embodiment of the exemplary inverter power supply of FIG. 1 in accordance with aspects of the present invention.

FIG. 3 illustrates an exemplary inverter type power supply 108 representing an alternate embodiment of the inverter type power supply 10 of FIG. 1. In this embodiment, as before, the main power supply 14 is configured to receive AC power 12 and includes the rectifier 26, the boost converter 28, the IGBTs 30, the transformer 32, and the diodes 34 and 36. However, in this embodiment, the background power supply 16 includes the transformer 38, the diodes 40 and 52, the capacitor 48, and the switch 50. Further, the output filter choke 22 is provided to smooth the power output from the main power supply 14 and the background power supply 16 before being supplied as the output voltage for the welding operation.

During operation, the embodiment of FIG. 3 differs from the embodiment of FIG. 1 at least because the output supplied by the background circuitry 16 is coupled to the output supplied by the main power supply 14 during a transient voltage requirement. That is, the background circuit voltage is added in series with the secondary voltage of the main transformer 32 in this embodiment. In such a configuration, the background circuit 16 need not be capable of supplying the entire power during a transient event. Instead, the background circuitry 16 supplies a portion of the power by adding a supplemental voltage in series with the main winding of the transformer 32. For example, if the capacitor 48 is charged to 40 volts, and the secondary voltage of the main inverter transformer 32 is 70 volts, then the combined voltage available to handle a transient load is 110 volts. As before, the transformer 38 may be limited in its ability to charge the capacitor 48, thus limiting the average total power that may be delivered through switch 50. Additionally, the capacitor 48 may still be charged in a regulated manner, for example, utilizing control circuitry (not shown in FIG. 3) similar to the embodiment of FIG. 1.

Figure 4:
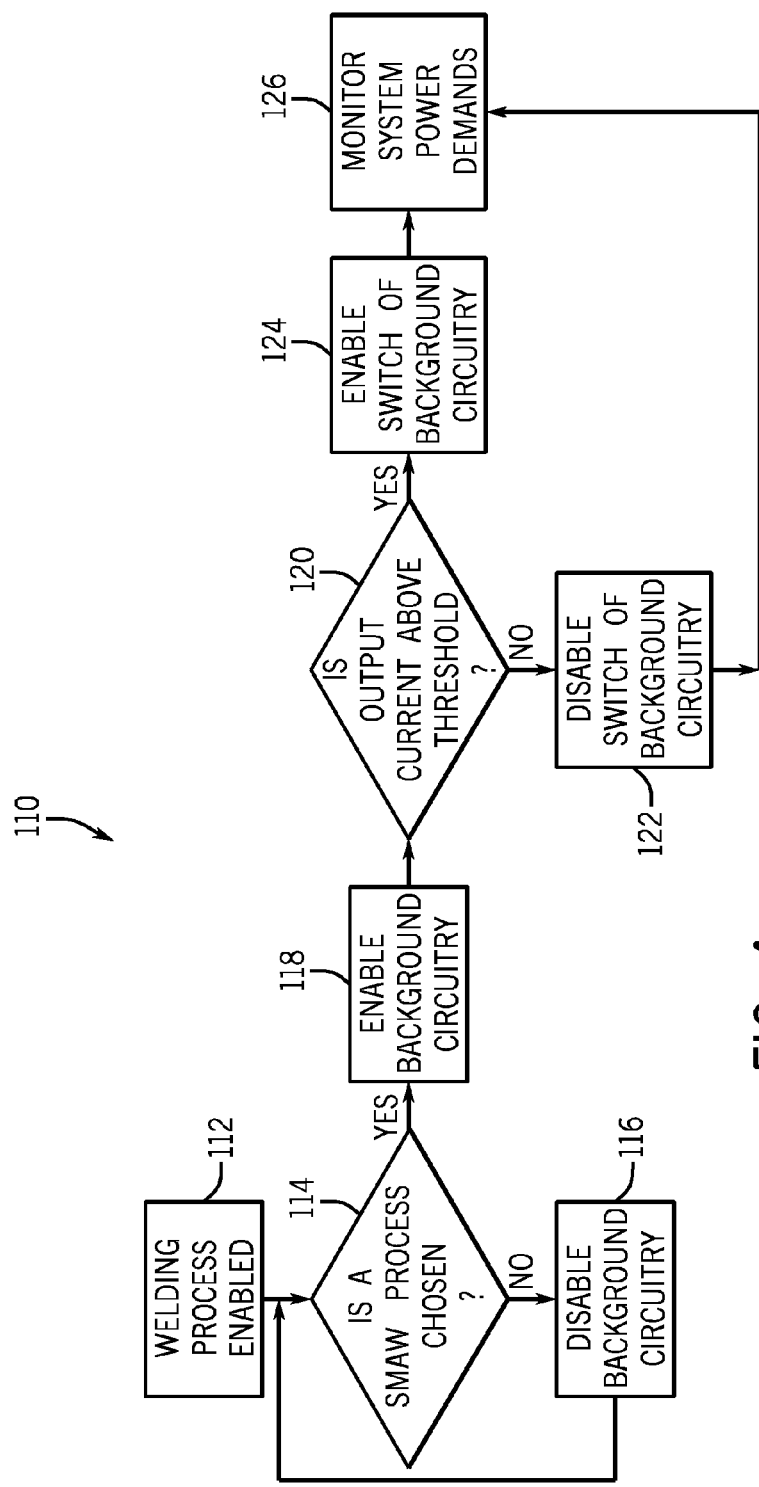
FIG. 4 is a block diagram illustrating exemplary control logic that may be employed by a controller of the inverter power supply of FIG. 1 in accordance with aspects of the present invention.

FIG. 4 illustrates exemplary control logic 110 that may be employed by the control circuitry of the power supply to control operation of the background circuitry. The logic begins when a welding process is enabled (block 112). The controller checks if a SMAW process is chosen by an operator (block 114), and, if not, the controller disables the background circuitry (block 116). If a SMAW process is chosen, the controller enables the background circuitry (block 118). In such a way, if desired, the background power supply may be exclusively utilized for SMAW processes.

The logic further includes checking if the output current exceeds a predetermined threshold (block 120). If the output current is below the given threshold (e.g., 10 amps), the controller disables the fast acting switch (e.g., switch 50) of the background circuitry (block 122) such that the voltage from the energy storage device (e.g., capacitor 48) of the background circuitry is not supplied to the welding terminals during an open circuit condition. If the output current is above the given threshold, the fast acting switch of the background power supply (e.g., switch 50) is enabled (block 124), and the power demands of the welding operation are monitored (block 126).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding power supply, comprising:
a main power supply rated for an average load requirement and comprising a first transformer configured to supply output current to welding electrodes for use in a welding operation when the power output requirement does not exceed a predetermined threshold and to not supply output current to the welding electrodes when the power output requirement exceeds the predetermined threshold; and
a background power supply comprising a second transformer configured to charge an energy storage device, wherein the power capability of the second transformer is below the average load requirement for which the main power supply is rated and the background power supply is configured to supply a regulated power output to the welding electrodes for use in the welding operation when the power output requirement exceeds the predetermined threshold and to not supply the regulated power output to the welding electrodes when the power output requirement does not exceed the predetermined threshold.

2. The welding power supply of claim 1, wherein the background power supply comprises a control circuit configured to set a level of the regulated power output based on a detected output current at the welding electrodes.

3. The welding power supply of claim 1, further comprising a fast acting switch disposed between the background power supply and the welding electrodes and configured to be actuated to allow flow of the regulated power output from the background power supply to the welding electrodes when the power output requirement exceeds the predetermined threshold.

4. The welding power supply of claim 1, further comprises a control circuit configured to disable the background power supply when a shielded metal arc welding (SMAW) process is not selected.

5. A welding power supply, comprising:
a main power supply rated for an average load requirement and comprising a first transformer configured to supply a first power output to welding electrodes for use in a welding operation;
a background power supply comprising a secondary transformer configured to charge an energy storage device to a regulated voltage level, wherein the background power supply is configured to discharge the energy storage device by a controlled amount to supply a second regulated power output to the welding electrodes for use in the welding operation; and
a control circuit coupled to the main power supply and the background power supply and configured to deactivate the background power supply to not produce the second regulated power output and to activate the main power supply to produce the first power output at a level equal to a power requirement of the welding operation when the power requirement of the welding operation is at or below the average load requirement and, when the power requirement of the welding operation exceeds the average load requirement to activate the main power supply to produce the first power output at a level equal to the average load requirement and to activate the background power supply to produce the second regulated power output at a level equal to a difference between the average load requirement and the power requirement of the welding operation.

6. The welding power supply of claim 5, wherein the control circuit is configured to prevent the background power supply from supplying the second regulated power output to the welding electrodes during open circuit conditions.

7. The welding power supply of claim 1, wherein the background power supply comprises a bleed off circuit and the energy storage device, and wherein the bleedoff circuit is configured to discharge the energy storage device to produce the regulated power output when the power output requirement exceeds the predetermined threshold.

8. The welding power supply of claim 5, wherein the background power supply comprises a bleedoff circuit configured to discharge the energy storage device by the controlled amount to supply the second regulated power output.

* * * * *